(12) United States Patent
Schmitt et al.

(10) Patent No.: US 10,780,377 B2
(45) Date of Patent: Sep. 22, 2020

(54) SANITIZING FILTER SYSTEM AND METHOD FOR A RESIDENTIAL WATER FILTERING SYSTEM

(71) Applicant: Watts Regulator Co., North Andover, MA (US)

(72) Inventors: Craig Schmitt, North Andover, MA (US); Renato Trovo, North Andover, MA (US); Tracie Benefiel, North Andover, MA (US)

(73) Assignee: Watts Regulator Co., North Andover, MA (US)

( * ) Notice: Subject to any disclaimer, the term of this patent is extended or adjusted under 35 U.S.C. 154(b) by 349 days.

(21) Appl. No.: 15/827,616

(22) Filed: Nov. 30, 2017

(65) Prior Publication Data

US 2018/0147506 A1 May 31, 2018

Related U.S. Application Data

(60) Provisional application No. 62/428,038, filed on Nov. 30, 2016.

(51) Int. Cl.
*B01D 29/15* (2006.01)
*B01D 61/08* (2006.01)
(Continued)

(52) U.S. Cl.
CPC ............ *B01D 29/15* (2013.01); *B01D 61/08* (2013.01); *B01D 61/12* (2013.01); *C02F 1/001* (2013.01);
(Continued)

(58) Field of Classification Search
CPC ........ B01D 61/08; B01D 61/10; B01D 61/12; B01D 2313/18; B01D 2311/04; B01D 2313/50; B01D 61/04; B01D 2311/16; C02F 1/441; C02F 9/005; C02F 2307/06; C02F 2209/005; C02F 2303/04; Y10T 137/9464; Y10T 137/6014; Y10T 137/87096; A61L 2/10
See application file for complete search history.

(56) References Cited

U.S. PATENT DOCUMENTS 2,227,297 A 1/1939 Coy
2,158,342 A 5/1939 Trader et al.
(Continued)

FOREIGN PATENT DOCUMENTS

CN 2203388 7/1995
CN 2725664 9/2005
(Continued)

*Primary Examiner* — Ana M Fortuna
(74) *Attorney, Agent, or Firm* — Burns & Levinson LLP; George N. Chaclas; Daniel McGrath

(57) ABSTRACT

A sanitizing filter for sanitizing a residential water filtering system has a water filter assembly including a cartridge operable for removable attachment to the water filter assembly. When the cartridge is attached to the water filter assembly, a water flow passes into the cartridge, mixes with sanitizing media within the cartridge, and passes back into the water filter assembly. The residential water filtering system is then filled and flushed repeatedly and the mixture of water and sanitizing media sanitizes the portions of the system that are downstream from the sanitizing filter.

20 Claims, 5 Drawing Sheets

(51) Int. Cl.
*C02F 1/00* (2006.01)
*C02F 9/00* (2006.01)
*B01D 61/12* (2006.01)
*C02F 1/44* (2006.01)
*C02F 1/28* (2006.01)

(52) U.S. Cl.
CPC .......... *C02F 9/005* (2013.01); *B01D 2201/32* (2013.01); *B01D 2313/18* (2013.01); *B01D 2313/44* (2013.01); *B01D 2313/48* (2013.01); *B01D 2313/56* (2013.01); *C02F 1/281* (2013.01); *C02F 1/283* (2013.01); *C02F 1/441* (2013.01); *C02F 2307/10* (2013.01)

(56) References Cited

U.S. PATENT DOCUMENTS

| | | | |
|---|---|---|---|
| 2,266,533 A | 12/1941 | Brisbane et al. | |
| 2,323,115 A | 6/1943 | Bryant | |
| D140,141 S | 1/1945 | Glatthar et al. | |
| 2,658,528 A | 8/1948 | Joseph | |
| 2,568,123 A | 7/1950 | Goldberg | |
| 2,684,689 A | 11/1950 | Nordin | |
| 2,564,066 A | 5/1951 | Jordan | |
| 3,095,006 A | 6/1963 | Smith | |
| 3,115,066 A | 12/1963 | Donald et al. | |
| 3,143,145 A | 8/1964 | Kauss | |
| 3,152,617 A | 10/1964 | Justus et al. | |
| 3,192,952 A | 7/1965 | Irlin | |
| 3,337,180 A | 8/1967 | Carlton | |
| 3,507,475 A | 4/1970 | Davis et al. | |
| 3,683,177 A | 8/1972 | Veloz | |
| 3,693,657 A | 9/1972 | Olson | |
| 3,735,777 A | 5/1973 | Katzer et al. | |
| 3,746,640 A | 7/1973 | Bray | |
| 3,761,050 A | 9/1973 | Puster | |
| 3,934,812 A | 1/1976 | Pett | |
| 4,017,734 A | 4/1977 | Ross | |
| 4,044,991 A | 8/1977 | Waller | |
| 4,089,350 A | 5/1978 | Gustin | |
| 4,129,141 A | 12/1978 | Vogeli | |
| 4,176,063 A | 11/1979 | Tyler | |
| 4,250,915 A | 2/1981 | Rikuta | |
| 4,256,284 A | 3/1981 | Balhouse | |
| 4,344,826 A | 8/1982 | Smith | |
| 4,345,593 A | 8/1982 | Sullivan | |
| 4,604,194 A | 8/1986 | Entingh | |
| 4,632,359 A | 12/1986 | Tooth | |
| 4,700,101 A | 10/1987 | Ellner et al. | |
| 4,705,625 A | 11/1987 | Hart, Jr. | |
| 4,768,553 A | 9/1988 | Marx | |
| 4,776,952 A | 10/1988 | Burrows | |
| 4,784,763 A | 11/1988 | Hambleton | |
| 4,791,962 A | 12/1988 | Moen | |
| 4,808,302 A | 2/1989 | Beall, Jr. | |
| 4,830,744 A | 5/1989 | Burrows | |
| 4,853,117 A | 8/1989 | Burrows | |
| 4,876,002 A | 10/1989 | Marshall et al. | |
| 4,885,085 A | 12/1989 | Beall, Jr. | |
| 4,895,654 A | 1/1990 | Burrows | |
| 5,006,234 A | 4/1991 | Menon et al. | |
| 5,057,214 A | 10/1991 | Morris | |
| 5,082,557 A | 1/1992 | Grayson et al. | |
| 5,096,589 A * | 3/1992 | Blind | C02F 1/441 210/638 |
| 5,103,857 A | 4/1992 | Kuhn et al. | |
| 5,122,265 A | 6/1992 | Mora et al. | |
| 5,132,017 A | 7/1992 | Birdsong et al. | |
| 5,160,608 A | 11/1992 | Norton | |
| 5,209,845 A | 5/1993 | Sims | |
| 5,215,178 A | 6/1993 | Bartlett | |
| 5,222,518 A | 6/1993 | Fisher et al. | |
| 5,282,972 A | 2/1994 | Hanna et al. | |
| 5,294,093 A | 3/1994 | Huveteau et al. | |
| 5,334,905 A | 8/1994 | Ullrich | |
| 5,393,419 A | 2/1995 | Tiede et al. | |
| 5,399,264 A | 3/1995 | Pulek et al. | |
| 5,435,909 A | 7/1995 | Burrows | |
| 5,460,716 A | 10/1995 | Wolbers | |
| RE35,252 E | 5/1996 | Clack et al. | |
| 5,527,433 A | 6/1996 | Begemann et al. | |
| 5,527,463 A | 6/1996 | Morgan, Jr. | |
| 5,547,590 A | 8/1996 | Szabo | |
| 5,565,063 A | 10/1996 | Begemann et al. | |
| 5,580,444 A | 12/1996 | Burrows | |
| 5,639,374 A | 6/1997 | Monroe et al. | |
| 5,660,720 A | 8/1997 | Walling | |
| 5,662,793 A | 9/1997 | Beall, Jr. | |
| 5,879,558 A | 3/1999 | Monroe et al. | |
| 5,976,363 A | 11/1999 | Monroe et al. | |
| 5,991,884 A | 11/1999 | Lin et al. | |
| 5,997,738 A * | 12/1999 | Lin | B01D 61/025 210/102 |
| 6,003,835 A | 12/1999 | Moller | |
| 6,004,458 A * | 12/1999 | Davidson | C02F 1/003 210/206 |
| 6,110,360 A * | 8/2000 | Hart, Jr. | B01D 61/08 210/110 |
| 6,136,196 A | 10/2000 | Weinberger | |
| 6,254,788 B1 * | 7/2001 | Davidson | C02F 1/003 210/764 |
| 6,272,468 B1 | 8/2001 | Melrose | |
| 6,401,758 B1 | 6/2002 | Ziv-Av | |
| 6,436,282 B1 | 8/2002 | Gundrum et al. | |
| 6,447,259 B2 | 9/2002 | Elliott-Moore | |
| 6,524,472 B2 | 2/2003 | Monroe | |
| 6,524,483 B1 | 2/2003 | Monroe | |
| 6,607,668 B2 * | 8/2003 | Rela | B01D 61/025 210/143 |
| 6,764,595 B1 * | 7/2004 | Halemba | B01D 61/08 137/590 |
| 6,960,321 B1 | 11/2005 | Ludwig | |
| 6,972,415 B2 | 12/2005 | Schaible et al. | |
| 6,988,509 B2 | 1/2006 | Frampton et al. | |
| 7,017,611 B2 | 3/2006 | Schmitt | |
| 7,111,638 B2 | 9/2006 | Johnson | |
| 7,172,697 B2 | 2/2007 | Chikura et al. | |
| 7,285,210 B2 | 10/2007 | Schmitt | |
| 7,353,838 B2 | 4/2008 | Schmitt et al. | |
| 7,434,595 B2 | 10/2008 | Schmitt | |
| 7,513,996 B2 | 4/2009 | Kloos et al. | |
| 7,550,084 B2 * | 6/2009 | Schmitt | B01D 61/025 210/134 |
| D598,279 S | 8/2009 | Seehoff et al. | |
| D598,578 S | 8/2009 | Hanley | |
| 7,569,981 B1 | 8/2009 | Ciancanelli | |
| 7,968,854 B2 | 6/2011 | Hormann | |
| 8,153,000 B2 | 4/2012 | Schmitt | |
| 8,343,338 B2 | 1/2013 | Schmitt | |
| 8,395,134 B2 | 3/2013 | Penhale et al. | |
| 8,425,782 B2 * | 4/2013 | Culler | C02F 1/006 210/103 |
| 8,444,918 B2 | 5/2013 | Tanaka | |
| 8,674,322 B2 | 3/2014 | Kohler | |
| 8,890,087 B2 | 11/2014 | Ben-David et al. | |
| 8,980,178 B2 | 3/2015 | Gaska et al. | |
| 9,114,365 B2 | 8/2015 | Schmitt | |
| 9,299,493 B2 | 3/2016 | Kuennen et al. | |
| 9,932,245 B2 | 4/2018 | Schmitt et al. | |
| 2004/0164022 A1 | 8/2004 | Solomon | |
| 2005/0173317 A1 | 8/2005 | Schmitt | |
| 2007/0095400 A1 | 5/2007 | Bergquist et al. | |
| 2011/0192429 A1 * | 8/2011 | Underwood | A61L 2/18 134/34 |
| 2014/0158905 A1 | 6/2014 | Hoang | |

(56) References Cited

U.S. PATENT DOCUMENTS

2014/0166590 A1    6/2014    Rozenberg et al.
2014/0202962 A1    7/2014    Bilenko et al.

FOREIGN PATENT DOCUMENTS

FR         2854820    11/2004
WO    2000/068152    11/2000
WO    2004/069368     8/2004

\* cited by examiner

SANITIZING FILTER SYSTEM AND METHOD FOR A RESIDENTIAL WATER FILTERING SYSTEM

CROSS REFERENCE TO RELATED APPLICATIONS

This application claims priority to and the benefit of U.S. Provisional Patent Application No. 62/428,038, filed on Nov. 30, 2016 and titled "A FILTER AND METHOD FOR SANITIZING A WATER FILTERING SYSTEM", the contents of which are incorporated herein by reference as though fully set forth herein.

FIELD OF THE INVENTION

The subject disclosure relates to water filtering systems, and more particularly to the improved sanitizing of a water filtering system.

BACKGROUND OF THE INVENTION

Drinking water quality is an important concern for many individuals worldwide. To that end, there are currently a number of systems on the market which allow users to filter and purify their residential water supplies. These systems are configured for use within a user's home and are often installed under a kitchen sink. Usually the systems receive water from a water supply source and pass the water through one or more filters into a storage tank. The water in the storage tank is then delivered to the user, via a faucet, for consumption. Typical water filtration systems employ a variety of different filters, such as carbon filters, sediment filters, and post carbon filters, for example.

Further, a number of current residential water filtration systems employ reverse osmosis (RO) filters. RO filters use a semi-permeable membrane that has the ability to remove and reject a wide spectrum of impurities and contaminants from water using only water pressure. For example, U.S. Pat. No. 8,343,338 issued to Schmitt on Jan. 1, 2013 describes a reverse osmosis water filtering system which can be used on a residential water supply.

Other systems employ water sanitizing media, such as chlorine, to purify their residential water supply. Sanitizing media can be used alternatively or additionally to water filtration systems.

After an extended period of use, the water filtration systems themselves may accumulate pathogens and require sanitization. Unfortunately, sanitizing the system can be difficult for a number of reasons. Since the water filtration system is built to distribute and contain water, there is no easy way to access the interior of the water filtration system for cleaning. Further, given the common designs and locations of water filtration systems (e.g. under the kitchen sink), introducing sanitizing media into the water filtration system can prove to be problematic. Even when a sanitizing media is entered into the water filtration system, it can be very difficult to control dosing and proper distribution of the sanitizing media within the system. Therefore there is a need for a way to sanitize a water filtration system that is convenient, efficient, and effective.

SUMMARY OF THE INVENTION

The subject disclosure overcomes the drawbacks of the prior art by providing a filter and method for simply and quickly sanitizing a water filtration system.

In at least one aspect, the subject technology relates to a sanitizing filter for sanitizing a residential water filtering system having a water filter assembly. The sanitizing filter has a cartridge operable for removable attachment to the water filter assembly. Sanitizing media is located within the cartridge. When the cartridge is attached to the water filter assembly, a water flow through the residential water filtering system distributes a mixture of the sanitizing media and the water, sanitizing a portion of the residential water filtering system.

In some embodiments, the sanitizing media is located in an inner chamber of the cartridge and water flowing through the cartridge passes through the inner chamber to mix with the sanitizing media. The cartridge can include: an annular inlet configured to receive water from the residential water filtering system and an upper nozzle located central to the annular inlet to pass water from the cartridge into the residential water filtering system. In some embodiments the inner chamber is located between a lower chamber within the cartridge and an upper chamber within the cartridge. The cartridge can include an outer chamber configured to route water from the annular inlet into the lower chamber. Further, the upper chamber can be located adjacent to the inner chamber and the upper nozzle (i.e. between the inner chamber and the upper nozzle) and the upper chamber can be configured to route water from the inner chamber into the upper nozzle. In some embodiments, a lower sediment pad is positioned to filter water between the lower chamber and the inner chamber. Similarly, an upper sediment pad can be positioned to filter water between the inner chamber and the upper chamber.

In at least one aspect, the subject technology relates to a method of sanitizing a residential water filtering system, the water filtering system operable to facilitate the transfer of water between a water supply and a faucet. The method starts with draining the residential water filtering system a first time. A sanitizing filter including sanitizing media is placed within the residential water filtering system such that water flowing between the water supply and faucet passes through the filter and mixes with the sanitizing media. The residential water filtering system is filled with water from the water supply such that an area of the residential water filtering system downstream of the sanitizing filter fills with a mixture of water and sanitizing media. A first time period is allowed to pass during which the residential water filtering system remains filled. The residential water filtering system is then drained for a second time. The system is flushed by advancing water from the water supply to the faucet for a second period of time. Flow through the faucet is blocked such that the residential water filtering system is filled. The residential water filtering system is then left idle, in a filled state, for a third period of time. The steps from draining the residential water filtering system a second time to allowing the residential water filtering system to remain filled for a third period of time are then repeated at least one. In some embodiments, these steps are repeated twice. Finally, the sanitizing filter is removed from residential water filtering system.

In some embodiments, the first period of time is between 20 seconds and 150 seconds. The second period of time can be between 30 seconds and 120 seconds. The third period of time can be between 5 and 15 minutes. The third period of time can also be between 9 and 11 minutes.

In some embodiments, after removing the sanitizing filter, the sanitizing filter can be replaced within the residential water filtering system with a reverse osmosis filter. In some embodiments, the residential water filtering system includes a post carbon filter downstream of the sanitizing filter and the method includes the step of replacing the post carbon filter. In some cases, after the step of replacing the post carbon filter, water can be advanced water from the water supply to the faucet to flush the system. In some embodiments, the residential water filtering system can include a carbon pre-filter and a sediment pre-filter located upstream of the sanitizing filter and the method can further include replacing the carbon pre-filter and the sediment pre-filter.

In at least one aspect, the subject technology relates to a method of sanitizing a residential water filtering system. In one typical embodiment, the water filtering system is operable to facilitate the transfer of water between a water supply and a faucet. At step (a) of the method, a first valve is actuated into a closed position to prevent water from the water supply from entering the water filtering system. At step (b) a second valve is actuated into an open position to drain the water filtering system by allowing substantially all of the water within the system to flow out of the faucet. At step (c) the second valve is actuated into a closed position to prevent water from leaving the water filtering system through the faucet. At step (d) a reverse osmosis filter is removed from a first location within the water filtering system. At step (e) a sanitizing filter is attached at the first location within the water filtering system. At step (f) the first valve is actuated into an open position to allow water from the water supply to flow through the sanitizing filter and fill the water filtering system. At step (g), after the water filtering system is filled at least 30 seconds are allowed to pass. At step (h) the first valve is actuated into the closed position to prevent water from the water supply from entering the water filtering system. At step (i) the second valve is actuated into the open position to substantially drain the water filtering system through the faucet. At step (j) the first valve is actuated into the open position to allow water to flow between the water supply and faucet for at least 60 seconds. At step (k) the second valve is actuated into the closed position to allow the water filtering system to be completely filled by water from the water supply. At step (l), after the water filtering system is filled, at least 10 minutes are allowed to pass. At step (m), steps (h) through (l) are repeated at least 3 times. At step (n) the sanitizing filter is removed from the first location. At step (o) the reverse osmosis filter is attached to the first location. At step (p) a first post carbon filter is replaced at a second location within the water filtering system with a second post carbon filter at the second location. At step, (q), steps (h) through (l) are repeated. The system is then sanitized and can be used to filter residential drinking water.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

The subject technology overcomes many of the prior art problems associated with sanitizing water filtering systems. The advantages, and other features of the systems and methods disclosed herein, will become more readily apparent to those having ordinary skill in the art from the following detailed description of certain preferred embodiments taken in conjunction with the drawings which set forth representative embodiments of the present invention.

In depicting the residential water filtering system and components thereof, common items such as conduits, interconnections, check valves, and various other flow valves are omitted from the drawings and discussion for the sake of clarity. The systems and components are shown in their most basic forms to assist in describing the subject technology. One skilled in the art would understand that a typical water filtering system, used in accordance with the subject disclosure, will contain many additional components not depicted herein.

Figure 1:
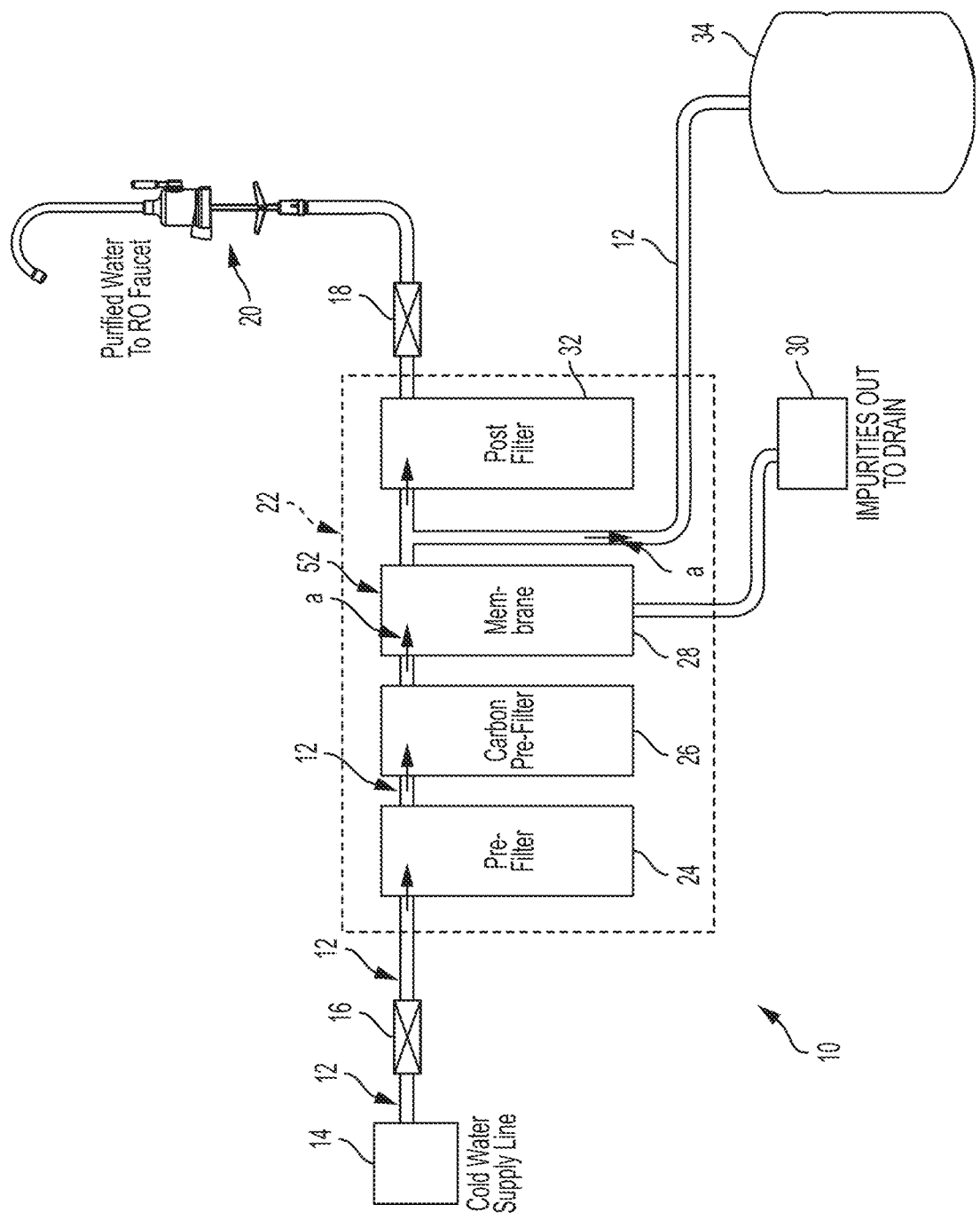
FIG. 1 is a schematic drawing that shows the major components of a typical residential RO water filtering system.

Referring now to FIG. 1, a schematic view of a typical residential RO water filtering system is shown at 10. In general, water 12 enters the water filtering system 10 from a water supply 14, is routed through the system 10 along the flow path of arrows "a", and is eventually distributed to a consumer through the faucet 20.

Water supply 14 can provide water 12 to the residential RO water filtering system 10 from a variety of sources, such as a city water line or a well, for example. The system 10 includes a gate valve 16 downstream of the water supply 14 and upstream of the other components of the system 10. The gate valve 16 can be actuated to control water 12 entering the system 10. Further, the system 10 includes a gate valve 18, upstream of the faucet 20 and downstream of the other components of the system, which can be actuated to control water 12 leaving the system 10 through the faucet 20. In general, gate valve 16 is the "upstream valve" for the system 10, controlling water flow entering the system 10, while gate valve 18 is the "downstream valve" for the system 10, controlling water flow out of the system 10.

When both gate valves 16, 18 are in the open position, water 12 flows between the water supply 14 and the faucet 20. Water 12 from water supply 14 enters the system 10 and is routed into the residential water filter assembly 22. Within the water filter assembly 22, the water 12 passes through "pre-filters" in sediment filter 24 and carbon filter 26 which are upstream of a reverse osmosis filter 28. The water 12 is then filtered through the RO filter 28. Purified water 12 passes through the RO filter 28 and continues through the system 10, while impurities are directed to a drain 30. After water 12 passes through the RO filter 28, the water 12 flows through a post carbon filter 32, out of the water filter assembly 22, and is discharged from the faucet 20 for consumption.

There is a limited flow capacity through RO filter 28. Therefore, to avoid having the RO filter 28 limit flow through the faucet 20, it might be desirable to store filtered water 12 in a storage tank 34 for later access. To fill the storage tank 34, the first gate valve 16 can be placed in the open position while the second gate valve 18 in the closed position. Once water 12 is stored in the tank 34, the second gate valve 18 can be actuated into the open position and water 12 that from within the storage tank 34 can then flow back into the filter assembly 22 to pass through the post carbon filter 32. The post carbon 32 filter removes any residual tastes or odors from the water 12 before the water 12 is discharged through the faucet 20 for consumption. Passing the water 12 through a post carbon filter 32 after storage can be beneficial in removing any tastes or odors that could be brought on by storing the water 12 within the storage tank 34.

Should a user desire to drain the system 10, as discussed below, the first gate valve 16 can be actuated into the closed position while the second gate valve 18 is in the open position. This allows water 12 to flow out of the system 10 via the faucet 20. Additionally, the user may actuate both the first and second gate valves 16, 18 into the closed position if they do not want water 12 to enter or leave the system 10. In this way, closing both gate valves 16, 18 will allow the system 10 to store the water 12 currently within the system 10 (or remain empty).

Figure 2:
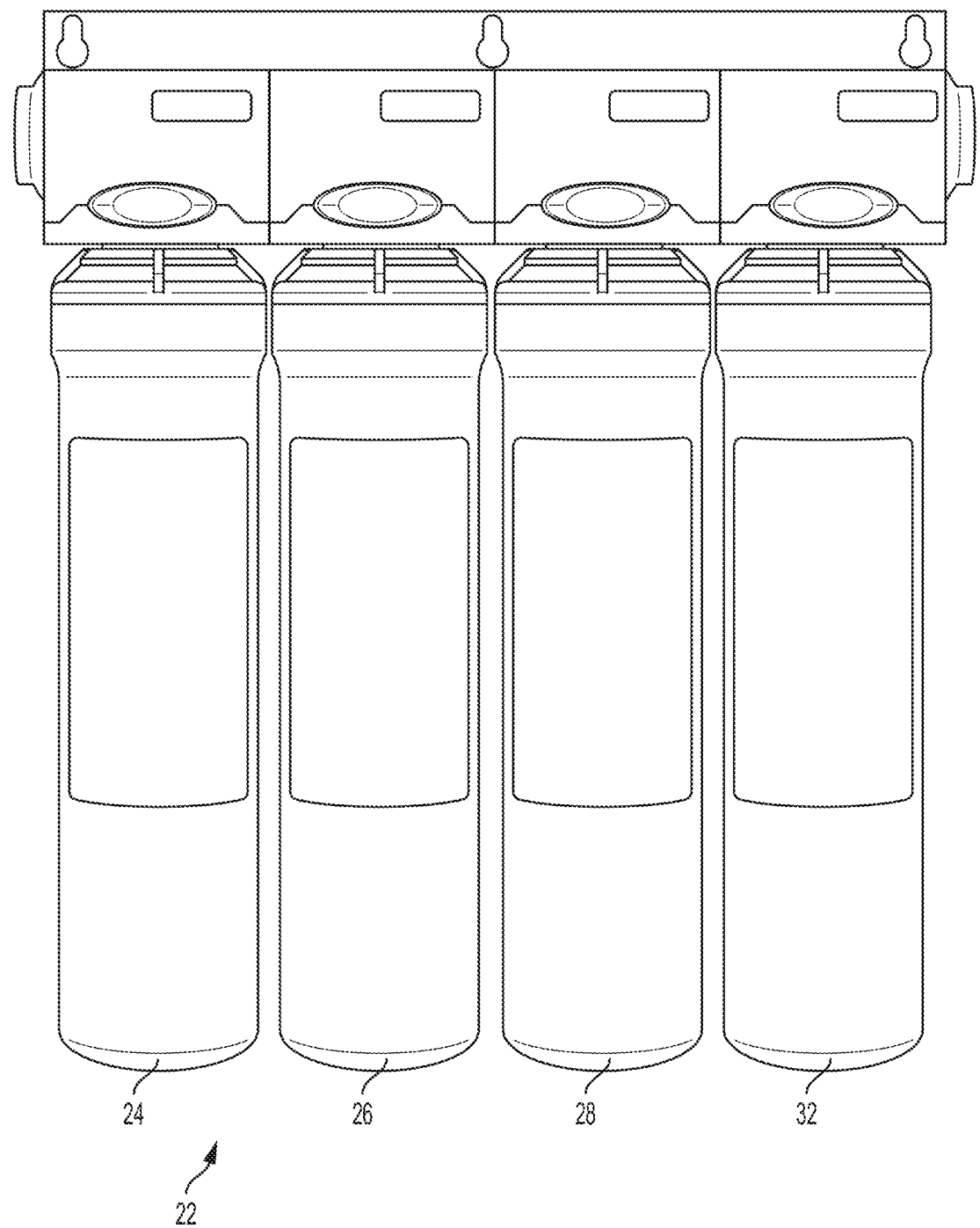
FIG. 2 is a front view of a residential water filter assembly for a residential water filtering system.
Figure 7:
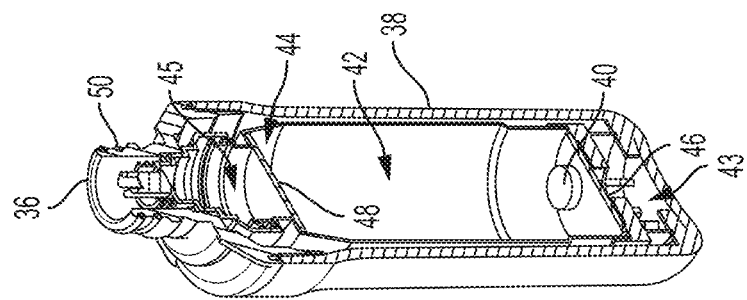
FIG. 7 is a cross-sectional perspective view of the sanitizing filter of FIG. 3.
Figure 6:
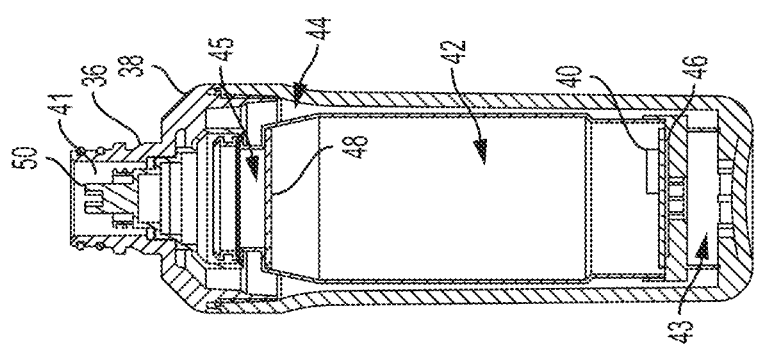
FIG. 6 is a cross-sectional front view of the sanitizing filter of FIG. 3.
Figure 5:
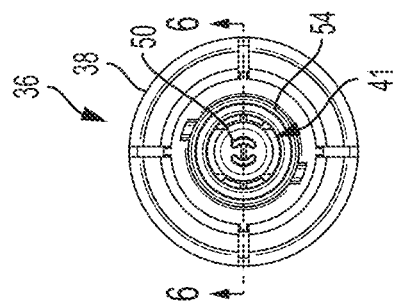
FIG. 5 is a top view of the sanitizing filter of FIG. 3.
Figure 4:
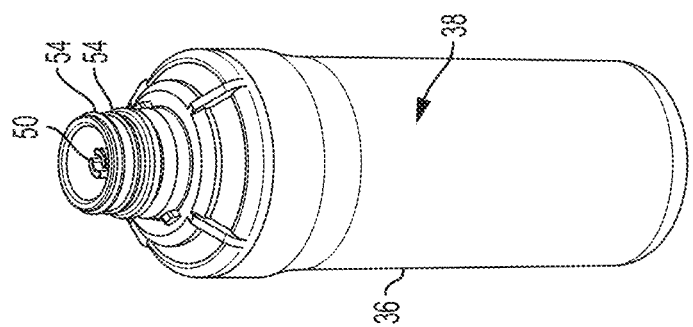
FIG. 4 is a perspective view of the sanitizing filter of FIG. 3.
Figure 3:
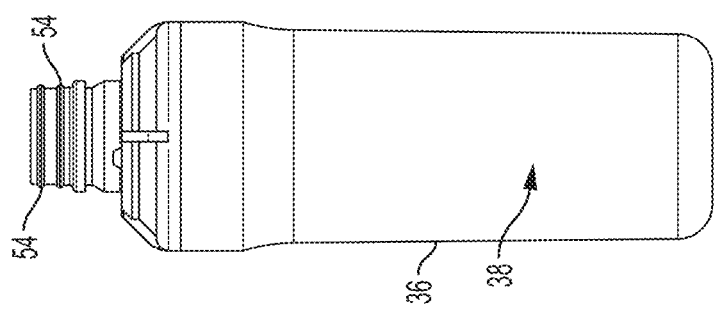
FIG. 3 is a front view of a sanitizing filter in accordance with the subject technology.

Referring now to FIG. 2, a front view of the filter assembly of a reverse osmosis water filtering system is shown at 22. The filter assembly 22 includes a sediment filter 24, carbon filter 26, RO filter 28, and post carbon filter 32. Each filter 24, 26, 28, 32 has a cartridge exterior which can be snapped or twisted into the filter assembly 22 and incorporated into the flowpath "a" of water 12 through the filtering system 10. Since the filters 24, 26, 28, 32, can be easily attached and removed from the filter assembly 22 allowing them to be removed or replaced as necessary without much hardship.

Referring now to FIGS. 3-7, a sanitizing filter 36 in accordance with the subject technology is shown. Much like the other filters 24, 26, 28, 32, the sanitizing filter 36 includes a cartridge 38 which allows the sanitizing filter 36 to be removably attached to the filter assembly 22 at any of the locations where other filters 24, 26, 28, 32 are attached (See FIGS. 1-2). Once attached, the o-rings 54 provide a tight seal between the sanitizing filter 36 and the filter assembly 22.

Sanitizing media 40 sits within an inner chamber 42 of the sanitizing filter 36. Sanitizing media 40 may include, for example, Aquatabs by Medentech, located at Clonard Road, Wexford, Ireland. Alternatively, other sanitizing media 40 typically associated with sanitizing drinking water can be used, such as chlorine.

When the sanitizing filter 36 is attached to the filter assembly 22, water 12 within water filtering system 10 can flow annularly, or through an inlet or annular inlet 41 into an outer chamber 44 within the cartridge 38. The water 12 can then flow through the outer chamber 44 and pass into a lower chamber 43. From the lower chamber 43, the water 12 passes through a lower sediment pad 46 and into the inner chamber 42 to mix with the sanitizing media 40. Mixed water 12 and sanitizing media 40 then pass through an upper sediment pad 48 into an upper chamber 45. The lower and upper sediment pads 46, 48 divide the inner chamber 42 and the lower chamber 43 and upper chamber 45, respectively (i.e. the pads 46, 48 are positioned between the inner chamber and the lower and upper chambers 43, 45, respectively). The lower sediment pad 46 filters water 12 flowing between the lower chamber 43 and the inner chamber 42. Likewise the upper sediment pad 48 filters water 12 flowing between the inner chamber 42 and the upper chamber 45.

From the upper chamber 45, the water 12 is routed out an upper nozzle 50, located central to the annular inlet 41, to pass downstream. In this way, a mixture of water 12 and sanitizing media 40 is provided to the water filtering system 10 at all areas downstream of the sanitizing filter 36. For example, in one embodiment, the sanitizing filter 36 is effective when the RO filter 26 is replaced with the sanitizing filter 36, thereby allowing all parts of system 10 downstream from the RO filter 26 to fill with the mixture of water 12 and sanitizing media 40. Once the downstream portion of the system 10 is filled with the sanitizing mixture, a period of time is allowed to pass while the sanitizing mixture works to sanitize the water filtering system 10. The sanitizing mixture can eventually be drained out through the faucet 20 by actuating the downstream gate valve 18 into the open position, as is discussed in more detail herein. When only drops of the mixture continue to flow out of the faucet 20, the water filtering system 10 is substantially drained. The upstream gate valve 16 can then be opened to allow an intake of water 12 from the water supply 14 to flow through the water filtering system 10. Allowing a flow between the water supply 14 and the faucet 20 (i.e. flowpath "a") for a period of time, such as 60 seconds, for example, allows the sanitizing mixture to be flushed through the water filtering system 10.

Figure 8:
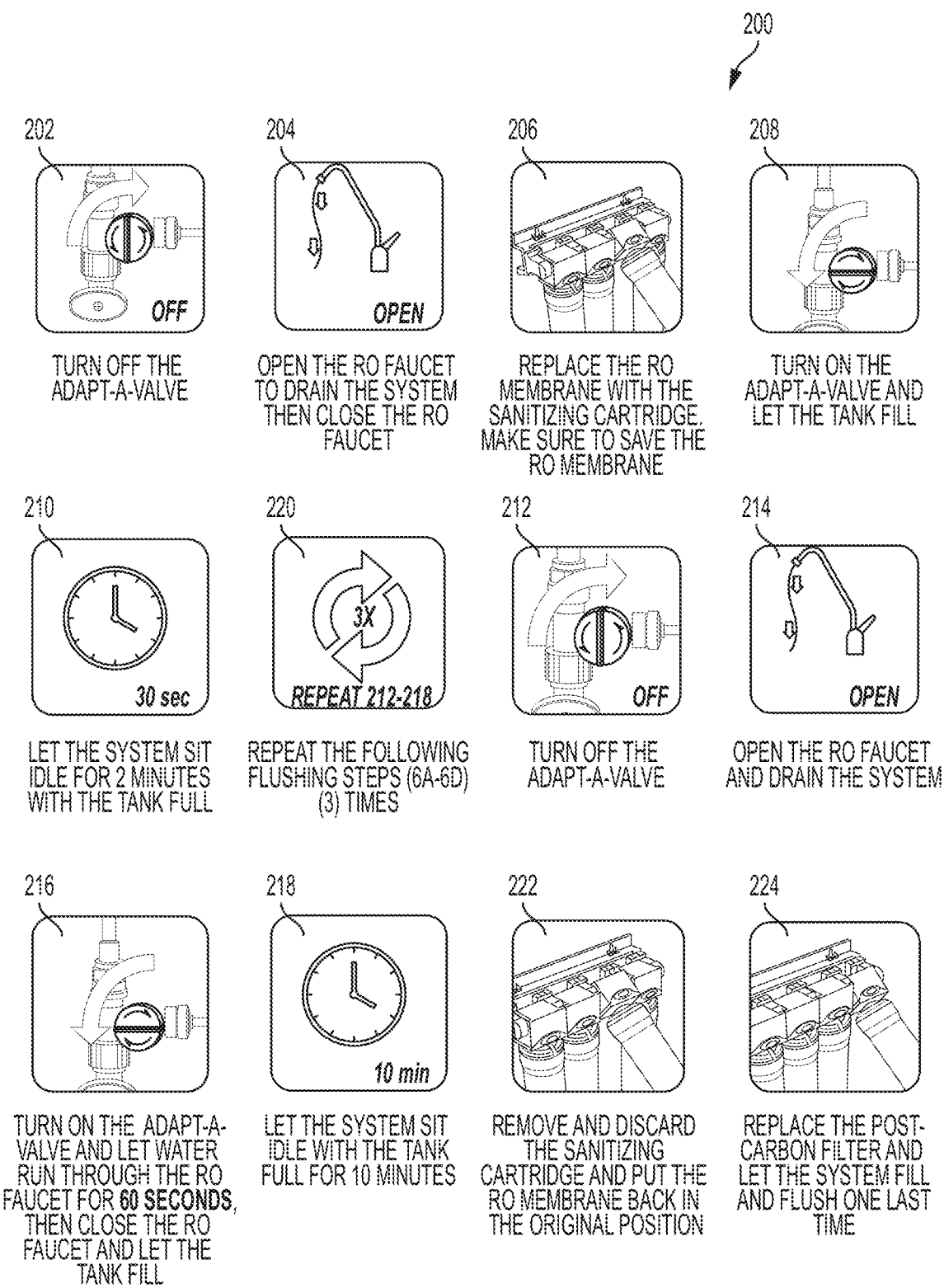
FIG. 8 is an exemplary flowchart illustrating a method for sanitizing a residential water filtering system in accordance with the subject technology.

Referring now to FIG. 8, an exemplary flowchart for a method for sanitizing a residential filtering system in accordance with the subject technology is shown generally at 200. It is envisioned that the method 200 is carried out on a water filtering system such as the residential water filtering system 10 of FIG. 1, which is operable to facilitate the transfer and filtration of water 12 between a water supply 14 and a faucet 20, or the like.

First, at step 202, a first, upstream valve 16 is actuated into a closed position to prevent water 12 from a water supply 14 from entering the water filtering system 10. Once the first valve 16 is closed, at step 204, a second, downstream valve 18 attached to a faucet 20 is actuated into an open position. This allows water 12 within the water filtering system 10 to pass through the faucet 20 while no new water 12 enters the system 10. Eventually, substantially all of the water 12 within the water filtering system 10 will drain through the faucet 20 and only drops, at most, will continue to flow through the faucet 20. Once the system 10 is drained, the second valve 18 is actuated into the closed position to close the system 10 and prevent any water 12 from leaving through the faucet 20 so that the system 10 can be filled.

At step 206, the RO filter 28 of the water filtering system 10 is removed from a first location 52 within the water filtering system 10. For example, the first location 52 can be within a water filter assembly 22 between sediment and carbon filters 24, 26 and storage tank 34 and post carbon filter 32 (downstream of the former and upstream of the latter). A sanitizing filter 36 is then attached at the first location 52 from which the RO filter 28 was removed. At step 208, the first valve 16 is actuated into an open position to allow water 12 from the water supply 14 to flow through the sanitizing filter 36 and fill the water filtering system 10. The sanitizing filter 36 includes sanitizing media 40 and, as such, water 12 passing through the sanitizing filter 36 mixes with the sanitizing media 40. Therefore it is a mixture of water 12 and sanitizing media 40 which fills the system 10 downstream of the sanitizing filter 36. The system 10 may take some time to fill, particularly if the system 10 includes a storage tank 34.

Once the system 10 is filled, the mixture will work to sanitize the areas of the water filtering system 10 downstream of the sanitizing filter 36. At step 210, the system 10 should be allowed to sit idle for at least 30 seconds to allow the sanitizing mixture to work. For example, the system 10 can be allowed to sit for two minutes to help ensure the sanitizing mixture has sufficient time to sanitize the system 10. After the sanitizing mixture has been allowed to work, the first valve 16 is actuated into the closed position to prevent new water 12 from the water supply 14 from entering the system 10 at step 212. With the first valve 16 in the closed position, the second valve 18 is then actuated into the open position and the system 10 is drained through the faucet 20 at step 214. At step 216, the system 10 is then flushed by actuating the first valve 16 into the open position and allowing a water flow between the water supply 14 and the faucet 20 for at least 60 seconds. The second valve 18 is then closed to prevent water 12 from flowing out of the system 10 and to allow the storage tank 34 to fill.

Once filled, at step 218, at least 10 minutes are allowed to pass while the water 12 within the system 10 mixes with any remaining sanitizing media 40 within the system 10. At step 220, steps 212 through 218 are repeated at least 3 times to ensure that the system 10 has been thoroughly cleansed of sanitizing media 40. Notably however, some sanitizing media 40, such as chlorine, is often used to disinfect drinking water. Thus, even if the cleansing process fails to remove all sanitizing media 40 from the system 10, it is expected that a small amount of sanitizing media 40 being consumed will not have a serious negative impact on a consumer's health.

At step 222, once the system 10 is flushed, the sanitizing filter 36 is removed from the system 10 by hand by simply popping or twisting the cartridge 38 out of a location 52 within the filter assembly 22. The RO filter 28 is then reattached to the location 52 from which the sanitizing filter 36 was removed.

The process of sanitizing the system 10 can sometimes have a negative impact on the post carbon filter 32. Therefore, at step 224, the used post carbon filter 32 is replaced with a new post carbon filter and steps 212-218 are repeated to flush the system 10 one more time. Optionally, other filters, such as the sediment filter 24 and the carbon filter 26, can also be replaced depending on their condition. After this process is complete, the system 10, from the RO filter 28 downstream to the faucet 20, is sanitized and a user can resume use of the water filtering system 10 to obtain drinking water 12 for consumption.

Figure 9:
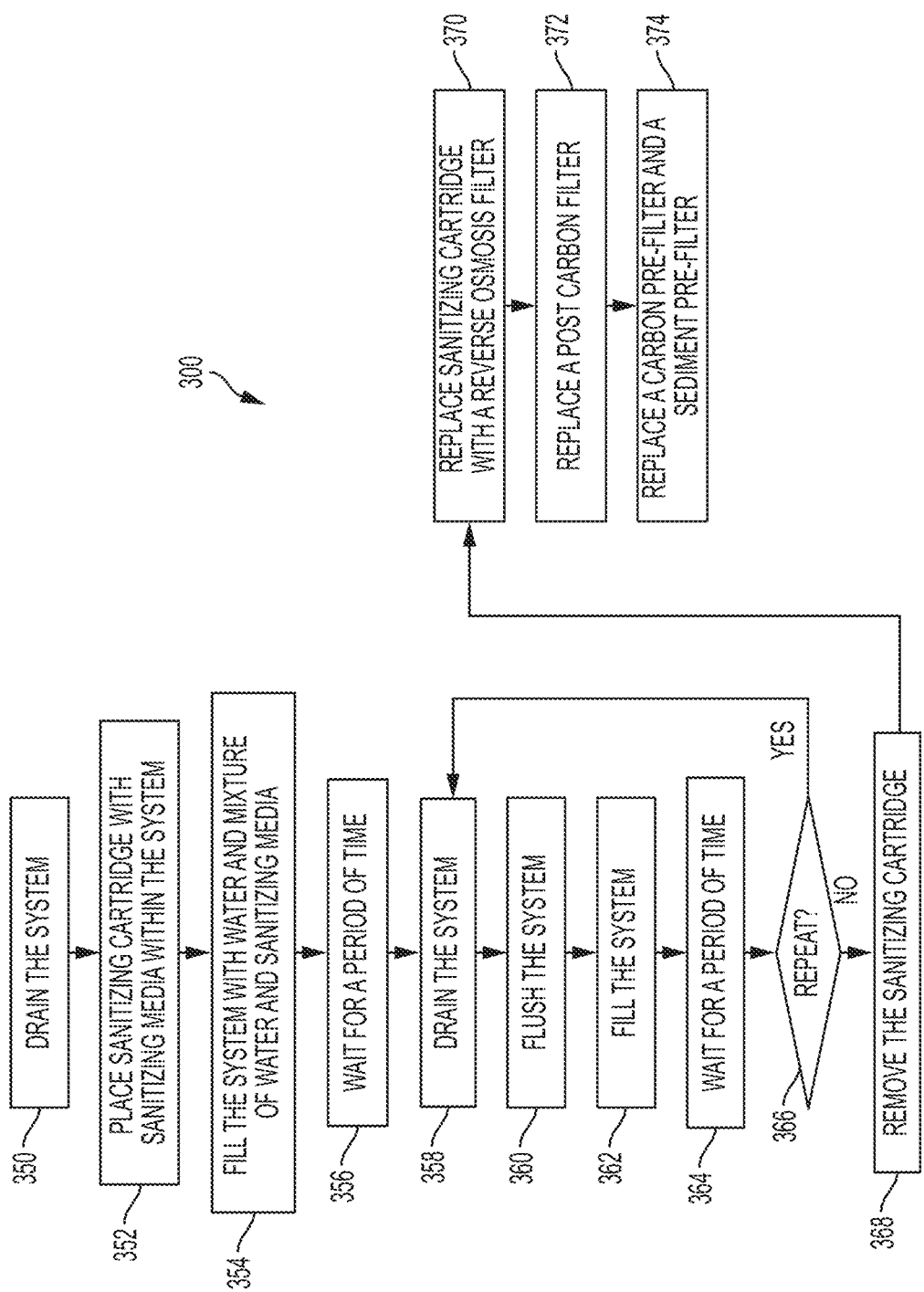
FIG. 9 is another exemplary flowchart illustrating a method for sanitizing a residential water filtering system in accordance with the subject technology.

Referring now to FIG. 9, another process an exemplary flowchart for a method for sanitizing a residential filtering system in accordance with the subject technology is shown generally at 300. Like the method 200, it is envisioned that the method 300 is carried out on a water filtering system such as the residential water filtering system 10 of FIG. 1, which is operable to facilitate the transfer and filtration of water 12 between a water supply 14 and a faucet 20, or the like.

The method begins, at step 350, with draining the residential water filtering system 10 for a first time. It should be noted that the word "first" is used in the term "first time" simply to distinguish step 350 from the subsequently numbered steps of draining. Therefore it should be understood that first time does not refer to the first time the system 10 has ever been drained, but rather, merely the first time in this particular method 300. This holds true for other references to a numerical order used herein, such as "second."

Next, at step 352, a sanitizing filter 36 is placed within the system 10. The sanitizing filter 36 can be similar to the sanitizing filter 36 shown in FIGS. 3-7, and can be placed in within the system 10 via attachment to a filter assembly 22, as shown in FIGS. 1-2. In a typical embodiment, the sanitizing filter 36 includes a cartridge 38 through which flow passes. The flow passes through a chamber (e.g. inner chamber 42) within the cartridge 38 where sanitizing media 40 is housed. Therefore as water 12 flows between the water supply 14 and the faucet 20, water 12 passing through the sanitizing filter 36 mixes with the sanitizing media 40 as it passes through the inner chamber 42.

At step 354, the system 10 is then filled with water 12. This can be accomplished by first actuating a downstream valve 18 into a closed position to prevent water 12 from flowing out the system 10. An upstream valve 16 can then be actuated to allow water 12 from the supply 14 to flow into the system 10. Water 12 will mix with sanitizing media 40 within the sanitizing filter 36 such that areas of the system 10 downstream of the sanitizing filter 36 (the sanitizing filter 36 being replacing the osmosis filter 28 in FIG. 1) will fill with a mixture of water 12 and sanitizing media 40. For example, in FIG. 1, the storage tank 34 will fill up with a mixture of water 12 and sanitizing media 40. By contrast, areas upstream of the sanitizing filter 36 will fill with regular water 12 from the water supply 14. Once the system 10 is full of water 12 (or water 12 mixed with sanitizing media 40), at step 356, the system 10 can be allowed to remain idle in the filled position for a period of time. In some embodiments, the period of time can be between 20 seconds and 150 seconds. For example, the period of time can be substantially 30 seconds or substantially two minutes. The term "substantially" is used herein with respect to time to denote a variance of +/−10%.

The system 10 is then drained at step 358, for example, by actuating an upstream valve 16 into a closed position and actuating a downstream valve 18 into an open position. The upstream valve 16 is then opened, at step 360, to allow water to advance between the supply line 14 and the faucet 20. In this way, the system 10 is flushed with water from the supply line 14 for a period of time. The flushing period can be an amount of time between 30 seconds and 120 seconds. For example, the system 10 can be flushed for substantially 60 seconds.

After the flushing period, at step 362, the system 10 is again filled, for example by actuating the downstream valve 18 (the upstream valve 16 being in the open position). At step 364, once the system 10 is again filled, the system 10 is once again left in a filled position for a period of time. However, the waiting period of time at step 364 is generally greater than the period of time at step 356. For example, the waiting period at step 364 can be between 5 minutes and 15 minutes, between 9 minutes and 11 minutes, and/or substantially 10 minutes in various embodiments.

At step 366, the preceding steps 358 through 364 are repeated at least one time to further sanitize and flush out the system 10. The steps 358-364 can be repeated a number of times depending on various factors such as size of the system 10 and level of desired sanitation. In one preferred embodiment, the steps 358-364 are conducted a total of exactly three times (i.e. they are repeated twice at step 366). After the steps 358-364 are repeated as desired, the method 300 proceeds to step 368. At step 368, the sanitizing filter 36 is removed from the filter assembly 22, and therefore from the system 10.

A number of optional steps 370-374 can also be performed, individually or together, in different embodiments of the method 300. At step 370, the sanitizing filter 36 can be optionally replaced with an RO filter 28 by attaching the RO filter 28 at the location within the filter assembly 22 from which the sanitizing cartridge 36 was removed. In some cases, the system 10 includes a post carbon filter 32. In such a case, it can be beneficial to replace the post carbon filter 32 at the end of the method 300 (or at least, after steps 350-368), at step 372. As part of step 372, the system 10 can then be optionally flushed again after the post carbon filter 32 has been replaced, similarly to the flushing described in step 360. Likewise, if the system 10 includes pre-filters such as a sediment filter 24 and a carbon filter 26 upstream of the sanitizing filter 36, it can be similarly beneficial to replace the pre-filter at step 374.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment.

Additionally, although the subject technology is discussed primarily in use with a RO water filtering system on a residential water supply, one skilled in the art would understand the subject technology has numerous useful applications. For example, the subject technology can be used on a variety of water distribution system, such as a system that provides water to an ice-maker, or any other similar device that requires clean water. Further, the subject technology could be used with other systems which distribute or transfer fluid other than water, as long as having a sanitized system is beneficial.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A sanitizing filter for sanitizing a residential water filtering system having a water filter assembly, the sanitizing filter comprising:
    a cartridge operable for removable attachment to the water filter assembly, the cartridge including:
        an annular inlet configured to receive water from the residential filtering system;
        an outer chamber configured to route water from the annular inlet into a lower chamber;
        an inner chamber located between the lower chamber and an upper chamber, the inner chamber configured to route water from the lower chamber into the upper chamber; and
        an upper nozzle located central to the annular inlet and configured to pass water from the upper chamber into the residential water filtering system; and
    a sanitizing media located within the inner chamber of the cartridge,
    wherein:
        when the cartridge is attached to the water filter assembly, a water flow through the residential water filtering system distributes a mixture of the sanitizing media and the water, sanitizing a portion of the residential water filtering system.

2. The filter of claim 1 wherein water flowing through the cartridge passes through the inner chamber to mix with the sanitizing media.

3. The filter of claim 2 wherein the upper chamber is located adjacent to the inner chamber and the upper nozzle.

4. The filter of claim 3 wherein a lower sediment pad divides the lower chamber and the inner chamber to filter water therebetween.

5. The filter of claim 4 wherein an upper sediment pad divides the inner chamber and the upper chamber to filter water therebetween.

6. The filter of claim 1, wherein all water flowing through the cartridge passes from the annular inlet to the outer chamber, from the outer chamber into the lower chamber, from the lower chamber into the inner chamber, from the inner chamber into the upper chamber, from the upper chamber into the upper nozzle, from the upper nozzle into the residential water filtering system.

7. The filter of claim 1, wherein the outer chamber is only fluidly connected to the inner chamber via the lower chamber.

8. The filter of claim 1, wherein walls of the inner chamber fluidly seal the inner chamber from the outer chamber.

9. The filter of claim 1, wherein the lower chamber is below the inner chamber and the upper chamber is above the inner chamber, the upper chamber being opposite the lower chamber.

10. A method of sanitizing a residential water filtering system, the water filtering system operable to facilitate the transfer of water between a water supply and a faucet, comprising:
    draining the residential water filtering system a first time;
    placing a sanitizing filter including sanitizing media within the residential water filtering system such that water flowing between the water supply and faucet passes through the filter and mixes with the sanitizing media;
    filling the residential water filtering system with water from the water supply, an area of the residential water filtering system downstream of the sanitizing filter filling with a mixture of water and sanitizing media;
    allowing the residential water filtering system to remain filled for a first period of time;
    draining the residential water filtering system a second time;
    advancing water from the water supply to the faucet for a second period of time;
    blocking flow through the faucet to fill the residential water filtering system;
    allowing the residential water filtering system to remain filled for a third period of time;
    repeating, at least one time, the steps from draining the residential water filtering system a second time to allowing the residential water filtering system to remain filled for a third period of time; and
    removing the sanitizing filter from residential water filtering system.

11. The method of claim 10 wherein the first period of time is between 20 seconds and 150 seconds.

12. The method of claim 10 wherein the second period of time is between 30 seconds and 120 seconds.

13. The method of claim 10 wherein the third period of time is between 5 and 15 minutes.

14. The method of claim 10 wherein the third period of time is between 9 and 11 minutes.

15. The method of claim 10 further comprising, after removing the sanitizing filter, replacing the sanitizing filter with a reverse osmosis filter within the residential water filtering system.

16. The method of claim 10 wherein the residential water filtering system includes a post carbon filter downstream of the sanitizing filter, further comprising replacing the post carbon filter with a new post carbon filter.

17. The method of claim 16 further comprising, after the step of replacing the post carbon filter, advancing water from the water supply to the faucet to flush the residential water system.

18. The method of claim 10 wherein in the step of repeating, at least one time, the steps are repeated two times.

19. The method of claim 10 where the residential water filtering system includes a carbon pre-filter and a sediment pre-filter located upstream of the sanitizing filter, the method further comprising replacing the carbon pre-filter with a new carbon pre-filter and replacing the sediment pre-filter with a new sediment pre-filter.

20. A method of sanitizing a residential water filtering system, the water filtering system operable to facilitate the transfer of water between a water supply and a faucet, comprising:

(a) actuating a first valve into a closed position to prevent water from the water supply from entering the water filtering system;

(b) actuating a second valve into an open position to drain the water filtering system by allowing substantially all of the water within the system to flow out of the faucet;

(c) actuating the second valve into a closed position to prevent water from leaving the water filtering system through the faucet;

(d) removing a reverse osmosis filter from a first location within the water filtering system;

(e) attaching a sanitizing filter at the first location within the water filtering system;

(f) actuating the first valve into an open position to allow water from the water supply to flow through the sanitizing filter and fill the water filtering system;

(g) waiting at least 30 seconds after the water filtering system is filled;

(h) actuating the first valve into the closed position to prevent water from the water supply from entering the water filtering system;

(i) actuating the second valve into the open position to substantially drain the water filtering system through the faucet;

(j) actuating the first valve into the open position to allow water to flow between the water supply and faucet for at least 60 seconds;

(k) actuating the second valve into the closed position to allow the water filtering system to be completely filled by water from the water supply;

(l) waiting at least 10 minutes after the water filtering system is filled;

(m) repeating steps (h) through (l) at least 3 times;

(n) removing the sanitizing filter from the first location;

(o) attaching the reverse osmosis filter to the first location;

(p) replacing a first post carbon filter at a second location within the water filtering system with a second post carbon filter at the second location; and (q) repeating steps (h) through (l).

* * * * *